United States Patent [19]
Heanue

[11] 3,787,914
[45] Jan. 29, 1974

[54] BAR EXCURSION CONTROLLER
[75] Inventor: Paul T. Heanue, Fayetteville, N.Y.
[73] Assignee: Lipe Rollway Corporation, Syracuse, N.Y.
[22] Filed: Oct. 12, 1972
[21] Appl. No.: 296,807

[52] U.S. Cl..................... 10/162 S, 82/2.5, 82/2.7, 82/3, 226/176
[51] Int. Cl............................................. B21h 27/02
[58] Field of Search............ 226/176; 82/2.5, 2.7, 3; 10/162 R, 162 S; 214/1.1, 1.5, 1 R, 1 P, 1.4

[56] References Cited
UNITED STATES PATENTS

| | | | |
|---|---|---|---|
| 2,855,815 | 10/1958 | Miller | 214/1.5 X |
| 3,527,126 | 9/1970 | Jones, Jr. | 226/176 X |
| 3,720,123 | 3/1973 | Eichenhofer | 82/3 |

*Primary Examiner*—Frank E. Werner
*Attorney, Agent, or Firm*—Cumpston, Shaw & Stephens

[57] ABSTRACT

A bar excursion controller is applied to a multispindle screw machine having a bar feeder that uses a driven roller with spring-loaded flanges for straddling, squeezing and feeding the bars in time with the machine. The excursion controller is built on a base plate that is mounted concentric with the stock reel for indexing with the stock reel, and it carries a back-up plate for each bar of the machine. The back-up plates are mounted adjacent the bars and opposite the driven roller and are radially adjustable for normally clearing the bars by the amount of acceptable off-axis movement for the bars.

10 Claims, 2 Drawing Figures

PATENTED JAN 29 1974 3,787,914

BAR EXCURSION CONTROLLER

THE INVENTIVE IMPROVEMENT

Several different arrangements have been used for feeding and replenishing bars in multi-spindle screw machines, but most of them have suffered some disadvantage so that they were not able to achieve fully automatic operation. The invention applies to a particular type of bar feeder for a mult-spindle screw machine and recognizes and solves some of its disadvantages to make it more reliable and more fully automatic. In doing so, the invention aims at simplicity, economy, efficiency, and reliability in bar feeding for multi-spindle screw machines.

SUMMARY OF THE INVENTION

The invention applies to a multi-spindle screw machine having a stock reel and a bar feeder that grips bars with a driven roller that has spring-loaded flanges for straddling, squeezing, and feeding bars in time with the machine. The invention includes an excursion controller arranged to limit offaxis movement of the bars in the region of the feeder, and the controller is built on a base plate mounted concentrically with the stock reel for indexing with the stock reel. A back-up plate for each bar of the machine is mounted on the base plate to be opposite the driven roller and adjacent the bars in the region where the bars are gripped by the driven roller, and the back-up plates are radially adjustable for normally clearing the bars by the amount of acceptable off-axis movement for the bars.

DRAWINGS

FIG. 1 is a partially schematic, elevational view of a preferred embodiment of the inventive bar excusion controller; and FIG. 2 is a cross-sectional view of the excursion controller of FIG. 1 taken along the line 2 — 2 thereof.

DETAILED DESCRIPTION

Figure 1:
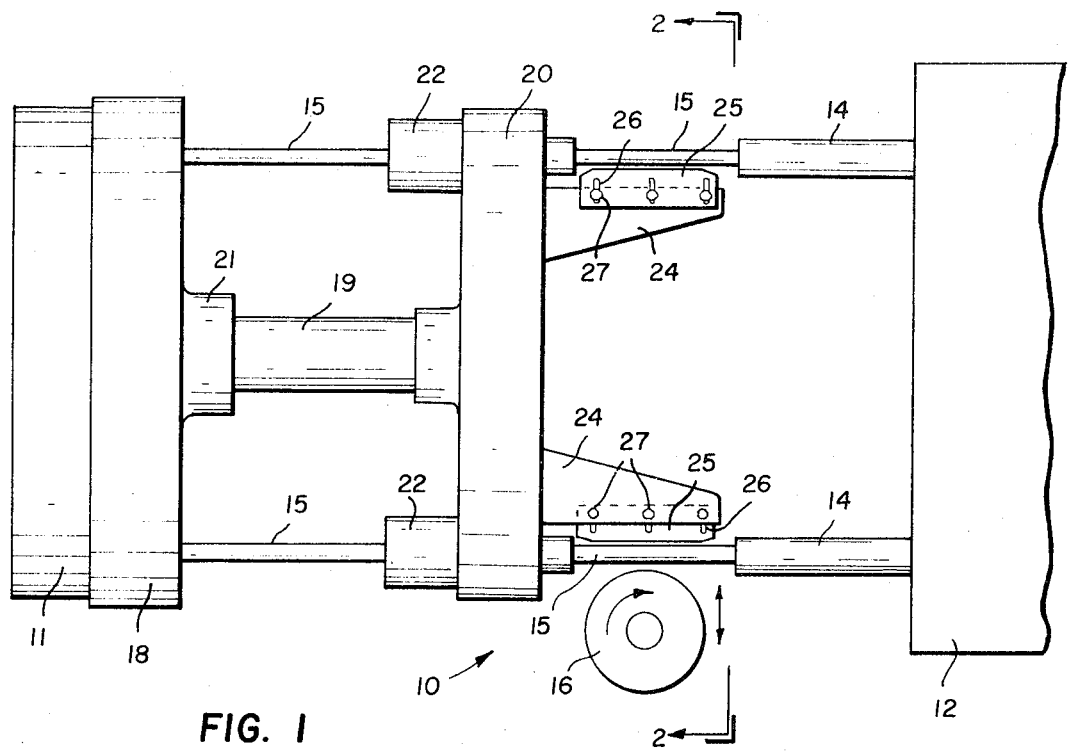
Figure 2:
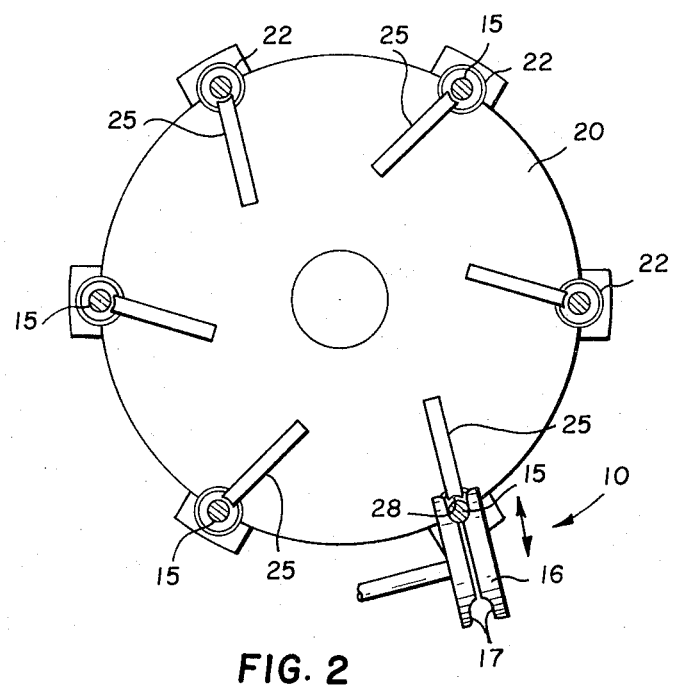

As shown schematically in FIG. 1, bar feeder 10 feeds bars 15 from stock reel 11 into multi-spindle screw machine 12 as is generally known. For convenience of illustration in FIG. 1, only an upper and lower bar 15 are shown, even though most multi-spindle screw machines receive six bars 15. FIG. 2 shows all six bars 15, but the invention is not limited to any particular number or arrangement of bars, however.

Bars 15 are fed from stock tubes (not shown) in stock reel 11 into spindle liners 14 of machine 12 by driven roller 16 of feeder 10. Roller 16 is split in half with the halves spring-biased together so generally parallel, spring-loaded flanges 17 are spaced for spreading slightly to straddle, squeeze, and feed bars 15. Roller 16 is raised and lowered in time with machine 12 as shown by the arrows for such gripping and feeding of bars 15.

Experience has shown that the smaller size bars 15 can get off course in the region of feeder 10, particularly as their leading or trailing ends pass by roller 16. Bars 15 rotate rapidly so that their trailing ends can vibrate or whip about, and the leading end of a bar is abutting relationship with a rotating bar ahead of it can be cast off its axial course and ride up alongside the preceding bar. Hence, although feeder 10 is fast, efficient, and reliable in feeding bars 15, some way of controlling bar excursion is necessary to prevent occasional mishaps, and this is provided by the invention.

A base plate 20 is mounted between stock reel 11 and machine 12 to be concentric with stock reel 11 and to index with stock reel 11. Base plate 20 can be mounted in different ways on different machines to index concentrically with the stock reel, and for one popular machine, the preferred mounting of base plate 20 is on a shaft 19 secured to stock reel index gear 18. Base plate 20 can then be moved axially of bars 15 to the desired position and is preferably fixed in place by clamp collar 21 on stock reel index gear 18.

Base plate 20 preferably carries interchangeable bushings 22 that are sized for guiding bars 15. Also, back-up plates 25 are mounted on support arms 24 fixed to base plate 20, and back-up plates 25 have oblong slots 26 through which they are secured to support arms 24 by bolts 27 for adjustment radially of base plate 20. Back-up plates 25 extend axially a substantial distance on each side of drive roller 16 as illustrated in FIG. 1, and plates 25 are thinner than the diameter of bars 15 to extend freely between flanges 17 of drive roller 16 as best shown in FIG. 2. Back-up plates 25 also have a curvature 28 that preferably fits bars 15 as shown in FIG. 2 and extends along the axial length of bars 15. Back-up plates 25 preferably span most of the distance between bushings 22 and spindle liners 14 across the region of feeder 10.

In operation, back-up plates 25 are adjusted for normally clearing bars 15 by the amount of acceptable off-axis movement of bars 15 so that movement of bars 15 away from drive roller 16 is limited by back-up plates 25. Drive roller 16 cycles as described above from its lower position shown in FIG. 1 to its upper position shown in FIG. 2 where flanges 17 straddle and engage a bar 15 for feeding bar 15 into machine 12. If bar 15 is relatively thin, it tends to bend away from drive roller 16 and not enter the space between flanges 17. This is prevented by back-up plate 25 which keeps bar 15 from bending excessively away from drive roller 16. Also, since back-up plates 25 extend axially forward and aft of drive roller 16, they prevent the leading and trailing ends of bars from bending, vibrating or whipping away from drive roller 16. Since bars 15 are rotating, back-up plates 25 have a dampening or controlling effect by limiting the excursion of bars 15 in one direction. This limits the total whipping or vibrational motion of bars 15 and keeps them under control.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the building and mounting of the inventive excursion controller on various screw machines, and will understand the structuring and adjusting of the invention to meet various circumstances.

I claim:

1. In a multi-spindle screw machine having a stock reel and a bar feeder that grips bars with a driven roller that has spring-loaded flanges for straddling, squeezing and feeding said bars in time with said machine, a bar excursion controller arranged to limit off-axis movement of said bars in the region of said feeder, said bar excursion controller comprising:

a. a base plate;

b. means for mounting said base plate concentric with said stock reel for indexing with said stock reel;

c. a back-up plate for each bar of said machine;

d. means for mounting said back-up plates on said base plate to be opposite said driven roller and adjacent said bars in the region where said bars are gripped by said driven roller; and e. means for radially adjusting said back-up plates for normally clearing said bars by the amount of acceptable off-axis movement for said bars.

2. The bar excursion controller of claim 1 wherein said back-up plates extend for a substantial axial distance on each side of said driven roller.

3. The bar excursion controller of claim 1 wherein said back-up plates are thinner than the diameter of said bars to extend freely between said flanges of said driven roller.

4. The bar excursion controller of claim 1 wherein said back-up plates are curved to fit the periphery of said bars along an axial length of said bars.

5. The bar excursion controller of claim 1 wherein said base plate is mounted on a shaft secured to the stock reel index gear for said machine.

6. The bar excursion controller of claim 1 including interchangeable bushings carried on said base plate adjacent said back-up plates to guide said bars.

7. The bar excursion controller of claim 1 wherein said back-up plates extend for a substantial axial distance on each side of said driven roller, and said back-up plates are curved to fit the periphery of said bars along an axial length of said bars.

8. The bar excursion controller of claim 7 wherein said back-up plates are thinner than the diameter of said bars to extend freely between said flanges of said driven roller.

9. The bar excursion controller of claim 8 including interchangeable bushings carried on said base plate adjacent said back-up plates to guide said bars.

10. The bar excursion controller of claim 9 wherein said base plate is mounted on a shaft secured to the stock reel index gear for said machine.

* * * * *